United States Patent [19]

Griffin et al.

[11] Patent Number: 4,952,922
[45] Date of Patent: Aug. 28, 1990

[54] PREDICTIVE LOOK AHEAD MEMORY MANAGEMENT FOR COMPUTER IMAGE GENERATION IN SIMULATORS

[75] Inventors: Arthur F. Griffin, Redondo Beach; Norton L. Moise, Pacific Palisades, both of Calif.

[73] Assignee: Hughes Aircraft Company, Los Angeles, Calif.

[21] Appl. No.: 756,869

[22] Filed: Jul. 18, 1985

[51] Int. Cl.⁵ .................................................. G09G 1/18
[52] U.S. Cl. .................................... 340/729; 364/522
[58] Field of Search ........................ 434/38, 41, 44, 35, 434/37; 364/578, 518, 423, 522; 340/729

[56] References Cited

FOREIGN PATENT DOCUMENTS 2113056 7/1983 United Kingdom ................ 340/729
2144608 3/1985 United Kingdom ................ 364/522

*Primary Examiner*—Ian J. Lobo
*Attorney, Agent, or Firm*—Leonard A. Alkov; Wanda Denson-Low

[57] ABSTRACT

A method for use with a vehicle simulator which provides for the rapid update of displayed terrain data in areas of non-visible terrain surfaces and terrain image discontinuities. The method is for use with a system which projects a time-varying computer-generated image scene representative of the terrain as viewed from a moving vehicle. The image scene is derived from a digital data base stored in slow speed secondary memory. The method includes the steps of predicting, by means of line-of-sight sampling ray, which segments of the data base could be visible after a predetermined time interval. The data base is accessed for the predicted segments of data and theres segments are retrieved therefrom. The data segments designated are tyhen stored in predetermined memory locations in high-speed main memory. Finally, selected ones of the stored segments are displayed based on the actual vehicle path and position after the predetermined time interval has elapsed.

4 Claims, 6 Drawing Sheets

PREDICTIVE LOOK AHEAD MEMORY MANAGEMENT FOR COMPUTER IMAGE GENERATION IN SIMULATORS

BACKGROUND OF THE INVENTION

The present invention relates generally to training simulators and, more particular, to a method of accessing and displaying image data for use with Simulators, such as aircraft flight trainers, and the like, are currently in wide use. The simulators are used to train vehicle operators, both military and commercial, or to permit an operator to become accustomed to the terrain over which he is to maneuver.

A major subsystem of mary simulators is a computer image generator (CIG). This device generates a real-time two-dimensional CRT image of the terrain over which the simulated vehicle is moving. The images which may be displayed include visual, infrared, or radar images, or the like. As is typically the case, a large data storage unit, such as a magnetic rotating disc memory, is utilized to store digital data indicative of images representing the terrain which is to be displayed. A person utilizing the simulator sits in a cockpit, for example, and "flies" the simulator as he would a conventional aircraft. The various aircraft flight controls interface with signal processing circuitry which accordingly control the images that are projected to the pilot.

Conventional systems have run into problems in dealing with the rapid update of displayed data. For example, if the simulated vehicle is made to traverse over the crest of a hill, the previously non-visible terrain image on the other side of the hill must be quickly accessed and projected to the operator in a very short time. Conventional CIG's have employed very coarse memory management schemes in which the data base is divided into segments corresponding to relatively large geographic areas. As the simulated aircraft moves from one area to another, the corresponding segment is read into memory. For a practical main memory size and for the large geographical area covered by each segment, the achievable scene detail has been severely limited. Furthermore, conventional CIG's serial data processing schemes which limit the speed at which data can be retrieved from the data base and displayed to the operator. The display may become blurred or the image may be discontinuous or jumpy, depending upon the system. This problem also has severely limited the scene detail that could be achieved for the situation just described.

Therefore, it would be an improvement to the CIG art to provide for a method which would allow for the rapid update of displayed images in situations where the terrain changes abruptly. This is particularly important for helicopter simulators.

SUMMARY OF THE INVENTION

The present invention provides for a method for use in a system which displays a time-varying computer-generated image scene of terrain as viewed from a moving vehicle which traverses a simulated path. The image scene is derived from a digital data base which stores data indicative thereof. The method generally comprises the steps of predicting and accessing the portion of the data base needed to generate a set of image scenes that potentially could be displayed after a predetermined time interval, based on the vehicle dynamics. The predicted portion of the data base is then accessed to retrieve the set of image scene data. Subsets of data, wherein each subset defines one of a set of image scenes wherein particular data defines the scene, are written into memory. The accessed set of image scene data is then written from the relatively slow speed data base into relatively high speed main memory locations. Finally, selected ones of the image scenes are generated and displayed based on the actual path and position of the vehicle after the predetermined time interval has elapsed. Therefore, a rapid update of the scene of displayed terrain is achieved where the terrain is presently not visible in the field of view but shall be displayed in the future, and in particular in areas of discontinuity of terrain features as required based upon the actual vehicle path which is traversed.

In particular, the method may be employed with a flight simulator representative of an aircraft or helicopter, or a vehicle simulator for vehicles which move on land, or the like. The images which may be projected include visual, infrared (FLIR) or radar images which are provided to the operation of the vehicle in real time.

The method may be employed for a plurality of successive time intervals, such as several frame times. Succeedingly larger subsets of the data base are stored for each subsequent time interval. Accordingly, by predicting the subset of data for the most remote time interval, the data required for the prior time interval is a subset of this data, and so on for all prior time intervals.

One aspect of the invention relates to a method for use in a system which projects a time varying computer generated image scene representation of terrain as viewed from a moving vehicle which traverses a simulated path, with the image scene being derived from the data base stored in slow speed secondary storage. The detailed steps for achieving this method are described as follows. First, a set of possible future positions of the vehicle is predicted after a predetermined time interval. The predicted positions are calculated based upon the dynamics of motion of the vehicle. Second, for a number of possible future positions, the terrain data base is sampled with line-of-sight rays projected from the position of the vehicle operator's eye into the database in cartesian coordinate space. Third, the data is marked at the point of sample ray-terrain surface intersection and the data for surfaces adjacent to that point as likely candidates for near-future display update. Fourth, the marked data is accessed and stored in high speed main memory. Fifth, selected stored data elements are displayed based on the simulated path and position of the vehicle after the predetermined time interval has elapsed. Consequently, a rapid update of the displayed terrain is achieved.

In accordance with another aspect of the invention, data is gathered by sampling picture elements (pixels) within the field of view in the plane of the display by projecting rays from the eye position through each of the sample pixels.

In accordance with yet another aspect of the invention, scene data is stored and retrieved by way of a collection of elements corresponding to cubic volumes that make up a three dimensional terrain model. Only those volume elements (voxels) containing terrain surfaces are stored. Voxel data are stored on slow speed memory. A bit map of all voxels in the terrain model is used, wherein each bit has a memory address that is computable from the x, y, z cartesian coordinate of the voxel, the binary state of each bit so addressed indicates whether the corresponding voxel does or does not contain a terrain surface. This bit map is always resident in high speed memory.

In accordance with the step of the invention requiring marking of the data is the selection of data base volume elements (voxels) that form a cube whose center is the voxel containing a terrain surface intersected by a projected sampling rays. The dimensions of the cube are calculated as a direct function of the distance from the eye position to the intersected surface voxel. The size of the cube of voxels for a given sampling ray is selected as a function of the range to the intercept point of the ray and the surface.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

The present invention is described herein with reference to the use of an aircraft flight simulator which displays visual image information to the operator. However, it is to be understood that other types of images, such as infrared (FLIR) or radar images, or the like, may also be displayed. In addition, the present invention is not limited to aircraft simulators, but may also be employed for land vehicle simulators, or the like.

Figure 1:
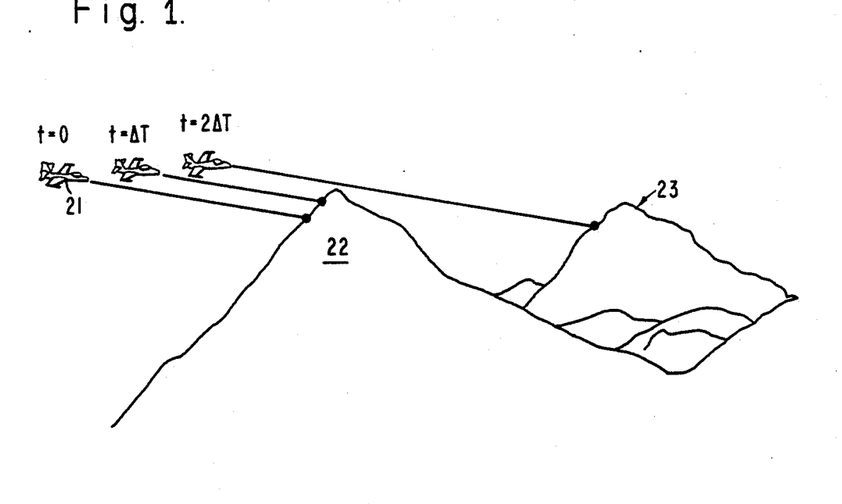
FIG. 1 illustrates a situation wherein terrain image discontinuities arise during a simulated flight indicated by three successive positions of the same aircraft.

Referring to FIG. 1, there is shown a typical aircraft flight situation which illustrates a terrain image discontinuity. The terrain image discontinuity is generally the worst case situation which is encountered. This situation is described for purposes of illustration. The general case shall be described later in the detailed description.

An aircraft 21 is representative of a simulated aircraft (simulated aircraft 21) and is approaching a hill 22. As the aircraft 21 reaches the crest of the hill 22, the terrain beyond the hill 22, indicated by arrow 23, comes into view. This change in image scene requires a rapid update of a display which is viewed by the operator of the simulated aircraft 21.

The data which is representative of the image scene viewed by the operator of the simulated aircraft 21 is stored in a digital data base. The data base is typically a rotating disk magnetic memory having relatively slow access time. The simulator projects a time-varying computer-generated image scene which is representative of the terrain viewed from the cockpit of the moving aircraft 21.

Figure 2:
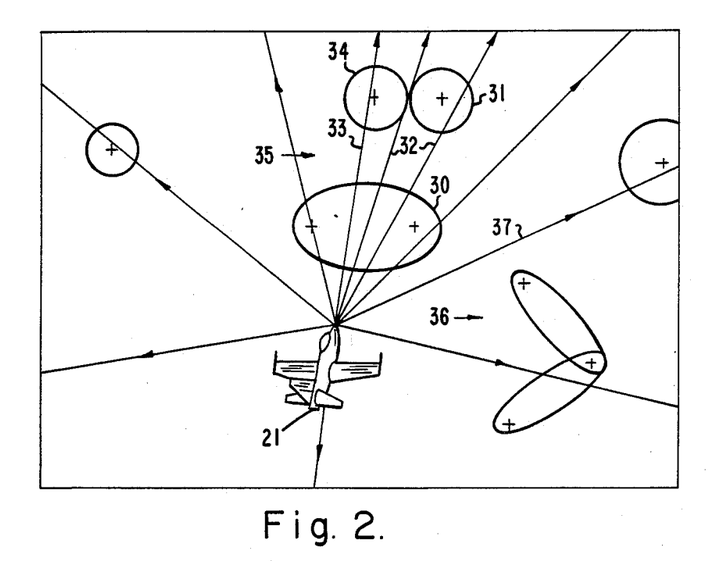
FIG. 2 presents a symbolic representation of a plurality of terrain discontinuities which might be encountered in a typical simulated flight.

Referring now to FIG. 2, the so-called "God's eye-view" of the simulated aircraft 21 and the terrain over which it is to fly is shown in symbolic form. In FIG. 2, the encircled areas, such as 30, 31 and 37, represent hills which produce terrain discontinuities and arrows, such as 32, 33 and 35, represent various line-of-sight options available to the pilot.

The simulator projects a time-varying computer-generated image scene representative of the terrain as viewed from the cockpit of the moving aircraft 21. The aircraft traverses a simulated flight path which is controlled by the operator by means of various aircraft controls. These controls (control stick, rudders, etc.) correspondingly control the image which is projected to the operator. The aircraft 21 is positioned at time $t=0$, and the portion or portions of the data base which correspond to the image that could be seen by a pilot after a predetermined time interval, or intervals, based on the flight dynamics of the aircraft are predicted. The various operator controls are determinative of the possible flight envelope of the aircraft, and hence are indicative of the flight dynamics thereof. The computer predicts where the aircraft could be at preselected time intervals after the time $t=0$. For instance, the computer could compute all possible positions after one second, two seconds, etc., out to a maximum of say five seconds.

Since the entire terrain data is stored in memory, the computer can determine exactly what terrain should be displayed after each predetermined time interval. The greater the number of time intervals for which this procedure is determined, the larger the amount of data that must be accessed.

The aircraft 21 shown in FIG. 2 is positioned at time $t=0$. At time $t=t+\Delta t$, the flight dynamics of the aircraft 21 may allow it to fly along any of the vectors shown, in addition to many others. There is a subset of possible flight paths which will encounter terrain discontinuities. These flight paths are indicated by vectors which intersect the encircled areas which are representative of hills. As the aircraft 21 approaches the crest of the hill identified by area 30, the more distant hills 31, 34, will suddenly come into view. Without efficient predictive look-ahead, this requires prohibitively large quantities of data to be transported from the data base before the display can be updated.

However, the present method described herein is employed to predictively transport the data required to support the display generation on a look-ahead basis from the data base to high speed memory locations. The terrain discontinuities, a major display problem, do not interfere with the smooth presentation of a continuous image display. The present method causes the data base to be accessed in advance for small segments of data representative of the terrain hidden from view at time t, but potentially revealed at time $t=t+\Delta t$. This data is stored in main computer memory (read from the data base) as long as it is potentially usable. Whenever particular data is required for display, the appropriate data values are obtained, not from slow speed memory but directly from main computer memory. Therefore, the display speed is greatly increased as compared to retrieving data from the data base.

Furthermore, as the aircraft 21 moves further and further along vector 33, those portions of the terrain for which the aircraft 21 cannot fly towards, based on its flight dynamics, are removed from memory because of the constant updating of the various memory locations employed in the present method. For example, as the aircraft 21 flies over the crest of the hill 30, the area identified by arrow 36 may be disregarded by the computational scheme provided by the present method since the pilot of aircraft 21 could never see that terrain in the near future.

A "worst case" situation has been described above. The present method also has general application to the retrieval and display of image data without terrain image discontinuities, in addition to its application to the terrain image discontinuity situation described above. For example, the present method may be employed to retrieve data associated with a completely flat terrain. This is best understood in the following context.

A simulated aircraft flying low to the ground at relatively high speed requires a rapid update of the visual images displayed to the operator. If, for example, the operator has limited visibility, say two miles, the image scene beyond two miles is not visible at time t=0. Accordingly, the present method may be employed to retrieve segments of data beyond the two mile visibility limit and store this data for future display. Therefore, the data is available for display when the aircraft reaches a point where the images become visible.

The data awaits display in a main memory location, and it is not necessary to retrieve the data from the data base. Therefore, the display speed of the simulator has been increased to the point where a realistic level of scene detail is achieved.

Figures 3A, 3B:
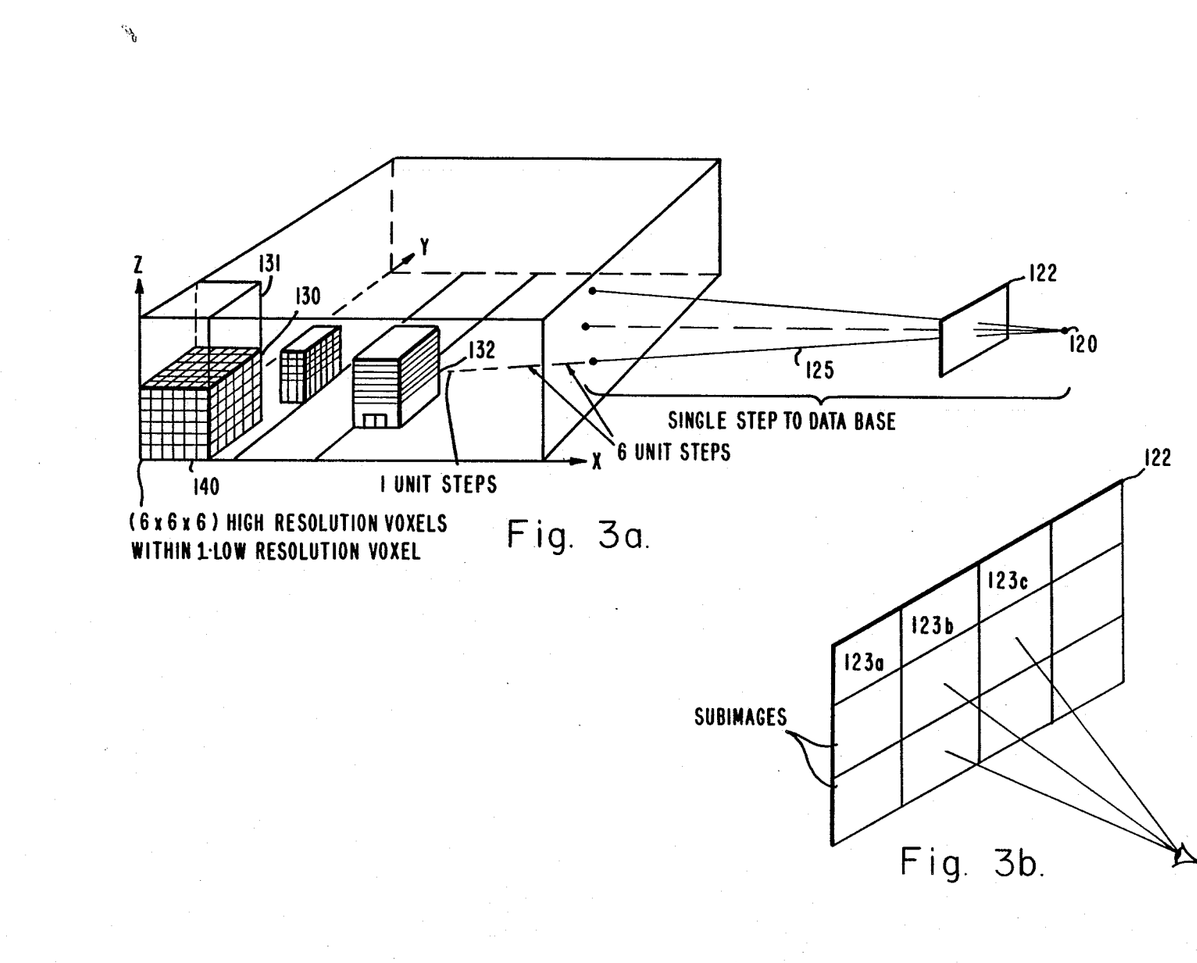
FIGS. 3a and 3b depict ray tracing of a visible surface represented by data base voxels.
Figure 4:
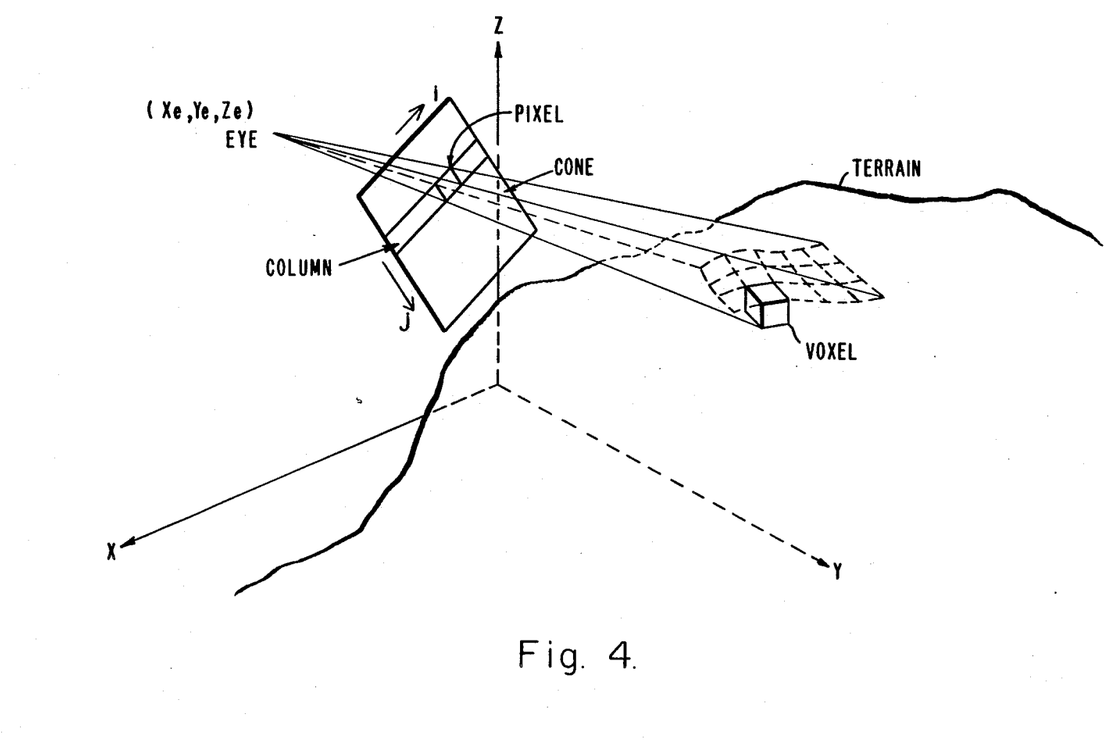
FIG. 4 illustrates a "pixel" cone intercepting surface "voxels"

Referring to FIG. 3, the relationship of the operator of the terrain simulator to the terrain is represented. The operator's eye position 120 is shown in conjunction with ray 125 into the data base. The data base is shown as organized into a cartesian coordinate system as represented by x-,y-,z- axes. The data is represented in terms of low resolution voxels 130 and 131 which are comprised in turn of high resolution voxels 140. FIG. 3 represents $6 \times 6 \times 6$, or 216, high resolution voxels per each low resolution voxel. The intersection of ray 125 with low resolution voxel 132 represents the operator's line-cf-sight encountering an object in the simulated terrain. Based upon the particular element of the terrain in which the object is located, the data base management method of the invention becomes operable.

Figure 5:
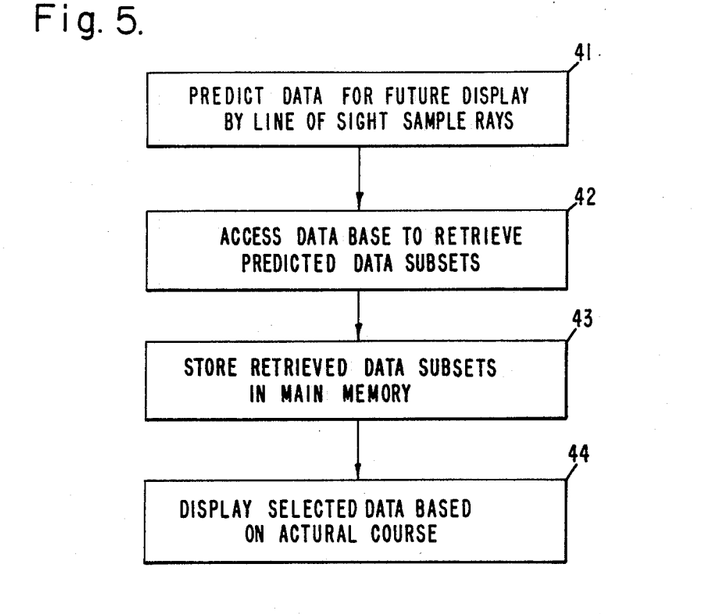
FIG. 5 illustrates, in flow diagram form, the steps in the method of the present invention.

To summarize the present method, reference is made to FIG. 5 which illustrates the present method in flow diagram form. The first step in the method is to predict the portion of the data base which corresponds to a set of image scenes that potentially could be displayed after a predetermined time interval, based on the flight dynamics of the simulated aircraft. This is represented by box 41. Thereafter, the data base is accessed to retrieve the predicted set of image scene data. This is represented by box 42. Next, the accessed set of image scene data is stored in high-speed main memory locations, represented by box 43 on an anticipate and replace basis. Finally, selected ones of the storage image scenes are generated from the image scene data and displayed based on the actual flight path and position of the simulated aircraft after the predetermined time interval has elapsed. This is represented by box 44. By employing this method, a rapid update of the display terrain is achieved based upon the actual flight path which is traversed.

The present invention is used in conjunction with two image generation techniques known as ray tracing inverse ray tracing.

In general, ray tracing and inverse ray tracing refer to the perspective transformation of 3D object points in a data base onto 2D image points of a screen. These approaches differ by their direction of projection in this transformation. Ray tracing projects 2D image points onto 3D object points. Inverse ray tracing projects 3D object points onto 2D image points.

Ray tracing approaches have been discussed in Section 16.6 of the text by J. D. Foley and A. Van Dam, *Fundamentals of Interactive Computer Graphics*, Addison-Wesby Publishing Co., 1982, and have been popular in the recent computer graphics literature due to their ability to include multiple reflections and create highly realistic images. The early exploratory work in inverse ray tracing performed by W. Blunker and R. Heartz of General Electric, *Perspective Display Simulation of Terrain*, Air Force Human Resources Laboratory, AFHRL-TR-76-39, 1976, was recently reported on by N. Ahuja and B. Schachter in chapter six of their text, *Pattern Models*, John Wiley & Sons, page 284, 1983, in which they present their "view-ray algorithm." A recent extensive continuation of this work was performed by B. Patz, P. Gatt, G. Becker, S. Ritchie, R. LeBlanc and L. Coulter, *Real Scan Evolution*, Technology Report No. NAVTRAEQUIPCEN 80-D-0014-2, 1982. Other early work on inverse ray tracing was discussed by R. Duda and P. Hart, *Pattern Classification and Scene Analysis*, John Wiley & Sons, page 380, 1973. This work was recently extended by R. Devich and F. Weinhaus, "Rural Scene Perspective Transformations," SPIE, Vol. 303, *Proceedings of the Visual Simulation and Image Realism II Conference*, page 54, 1981 and R. Devich and F. Weinhaus, "Image Perspective Transformations," *Optical Engineering*, Vol. 20, No. 6, page 912, 1981.

Figure 6:
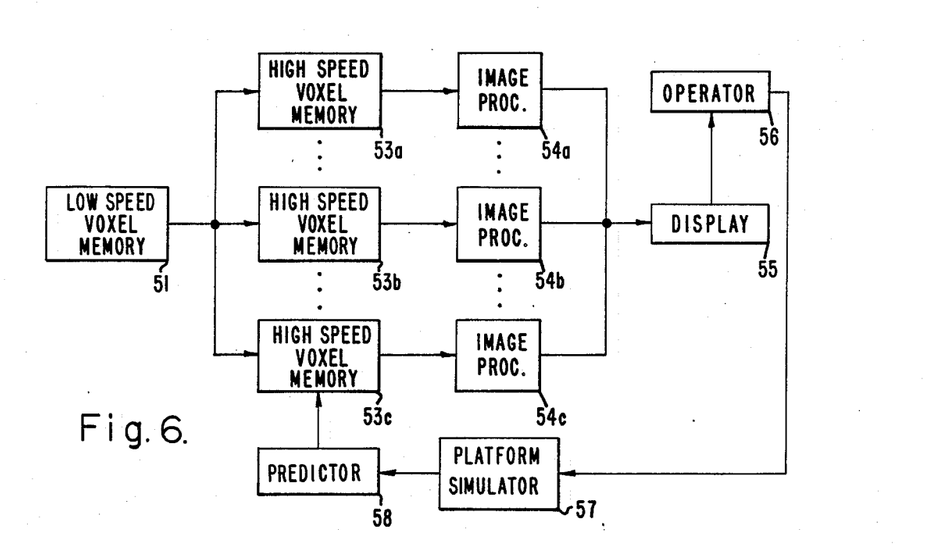
FIG. 6 illustrates a block diagram of a portion of a terrain simulator which implements the method of the present invention.

Referring to FIG. 6, there is shown a computer image generator in block diagram form, which employs the method of the present invention in concert with either ray tracing or inverse ray tracing. Multiple image processors 54 use ray tracing to independently generate subimages for example, 123a, 123b and 123c, of the viewing screen 122 (FIG. 3b) seen by the operator 56.

The operator 56 utilizes various simulator controls to control a platform simulator 57. Outputs from the platform simulator 57 go to a predictor 58 which produces current and predicted positions and attitudes of the platform. The viewing screen orientation eye position and platform position prediction determine the anticpated field-of-view (FOV) projections. These projections are the inputs for the current invention which loads the appropriate part of the low speed voxel memory 5 into the indivdual high speed voxel memories 53.

Figure 7A:
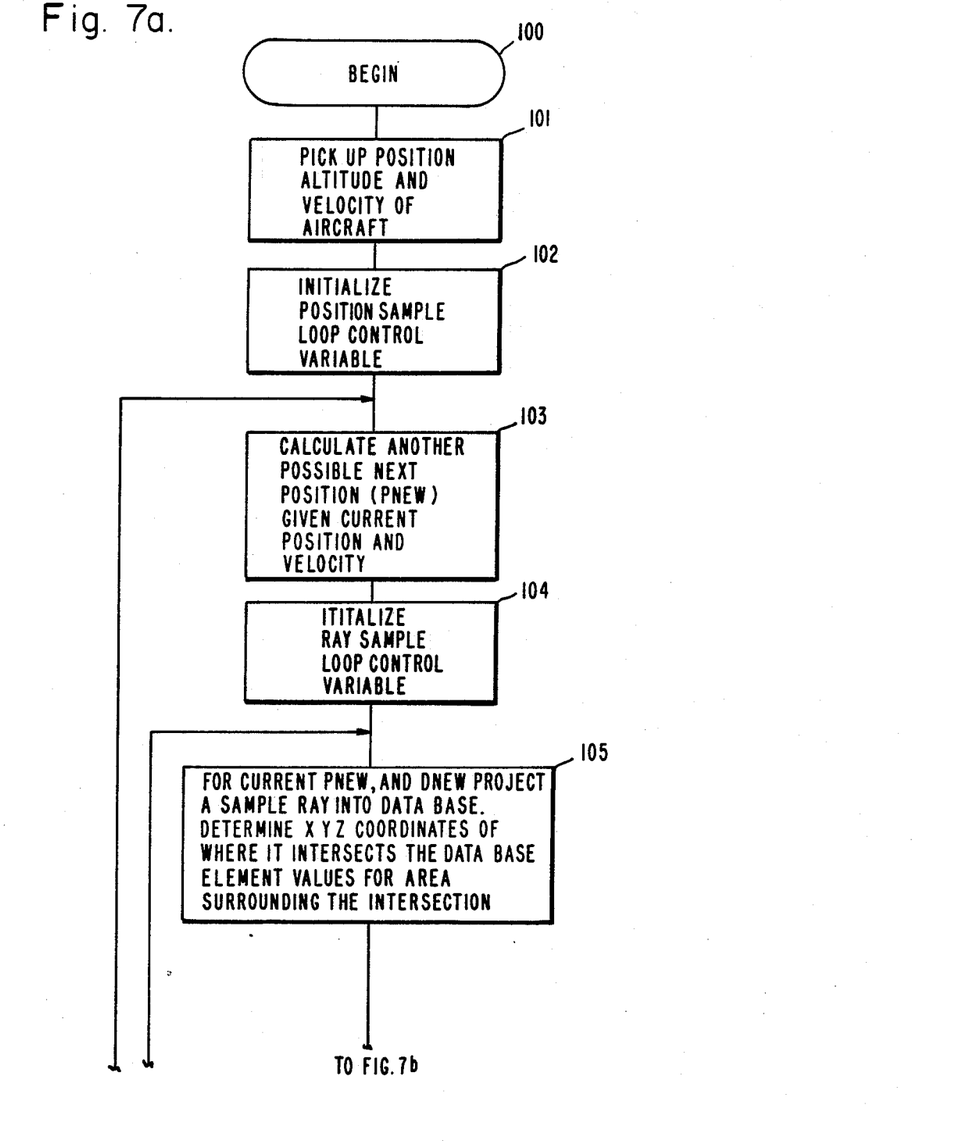
FIGS. 7a and 7b illustrates a flow chart representative of a computer program which may be employed to implement the present invention.
Figure 7B:
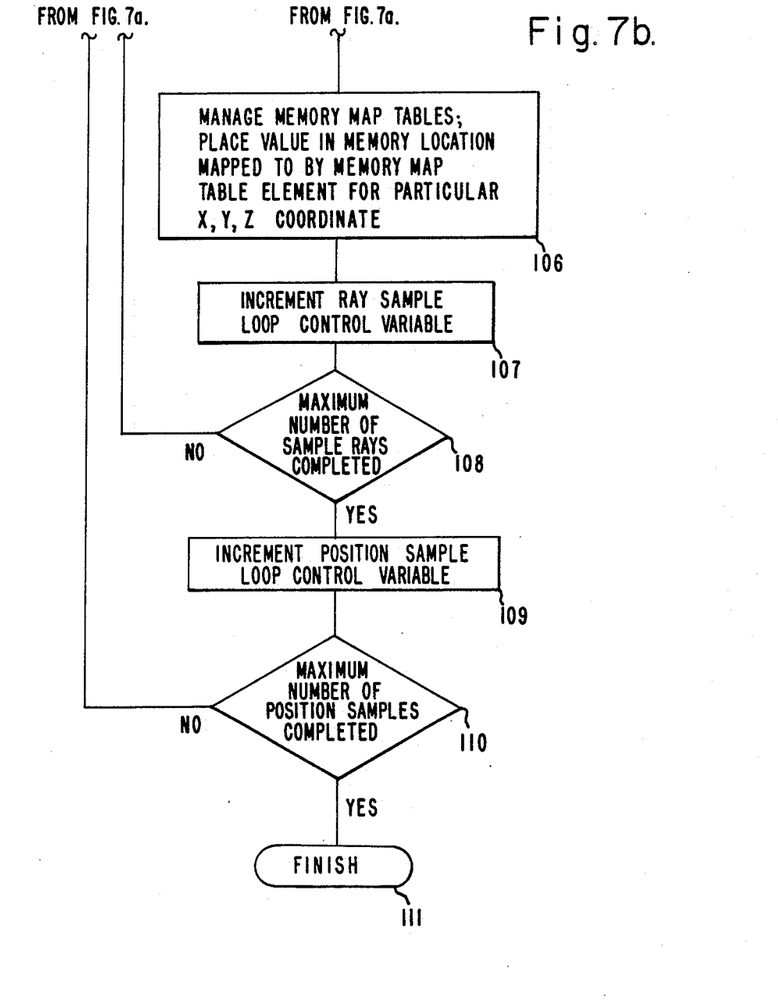

FIG. 7a and 7b show a flow chart representative of a computer program which may be employed to implement the present invention. A program derived from this flow chart may be run on a general purpose computer, such as an IBM 370, or the like. However, as is typically the case, special purpose high-speed processors are utilized for real time image generation. Presented hereinbelow is a discussion of the flow chart and the computational steps required to implement the present method.

Referring to box 100, predictive look-ahead is required on a cyclic basis. The exact period depends upon available processing power, as well as the velocity of the aircraft 21. Each time the computational process is invoked, control transfers to the top of this flow diagram. With reference to box 101, the position, attitude, and velocity of the aircraft at time =t are values which are necessary to the computation of the boundaries of possible aircraft position (flight envelope) at time=t+$\Delta$t. In box 102, the number of sample positions desired is a parameter which varies according to processing power as well as aircraft velocity and/or the value of $\Delta$t. These variables are initialized for program control purposes.

Given a particular aircraft position and velocity, in time period $\Delta$t, the aircraft can only move within some range of directions. Therefore, a subset of these possibilities can be selected as a sample with a selected distribution. The distribution is a parameter, as is the number of samples taken, as discussed above with reference to box 102. The computation which results in a sample aircraft position at time=t+$\Delta$t is the application of a distribution function to the direction vectors. The step identified by box 103 indicates that yet another member of the sample set of possible positions is to be considered. The number of vector samples desired for each of the sampled aircraft positions is a parameter dependent upon processing power, as well as aircraft altitude. Therefore, the control variables associated with the vector samples must be initialized, as indicated in box 104.

A parameterized distribution function is applied to the aircraft field-of-view to determine the set of sample vectors which are projected from the future aircraft position currently being considered. Each element of this set of sample vectors are analyzed in turn. The analysis consists of determining the x, y, z coordinates where the sample vector intersects the terrain surface. All data base elements within a parametrically determined range surrounding this intersection point are retrieved. This is indicated in box 105. Referring to box 106, each set of values returned from step 105 is stored in the computer's main memory. Memory map tables are managed to reflect the presence of data from this new coordinate. When the image generation software requires data from a particular x, y, z coordinate, the memory management software refers to the memory map tables to return the value already resident in main memory for that coordinate.

The inner loop is repeated once for each sample vector, as indicated in box 107. The program returns to process the next vector unless all sample vectors have been processed. If they have, control falls through. This step is indicated in box 108. The outer loop is repeated once for each sample position, as indicated in box 109. The program returns to process the next position unless all sample positions have been processed. If they have, control falls through. This step is indicated in box 110. Once the predictive lookahead function is complete for the cycle, control is relinquished to other processing functions in the computer. This is indicated by box 111.

The steps of box 105 and box 106 of FIG. 6 will now be described in detail in a pseudo code listing format, which is a familar format to those in the art. With respect to each of the boxes, the variables and data structure are described first, followed by a description of the algorithm used.

The variables and data structure for box 105 are as follows:
TERRAIN-DISK: Array of files containing data on visible color intensity, radar reflectivity, etc. for a cubic volume at coordinate x, y, z. Each cubic volume is called a voxel; only voxels containing a terrain surface are stored. Transparent voxels and underground voxels, which make up 95% of the volume in a typical terrain data base, are not included. Files are stored on slow speed, secondary storage, e.g., disk.
VOX#: Unique integer that indentifies each terrain voxel at x, y, z:
VOX#:=x * Radix **2+y*Radix+z e.g., for Radix=16,
VOX#:=256*x+16*y+z
VOX-MAP: Array [0 to total number of voxels, surface+non-surface] of bits:
1=surface voxels,
0=transparent or underground voxels;
TERRAIN MAIN: Array of records (same data structure as TERRAIN-DISK files) consisting of a subset of voxels stored on disk.
PAGE#: Unique integer that identifies a particular record of TERRAIN MAIN; also indicates the order in which voxels are retrieved from disk.
MEMORY-MAP: array of integers [1 to MAX-PAGE#]=VOX#; array is stored in associative memory to also allow the inverted VOX# to PAGE# mapping.
PNEW: Record of 3 integers x,y,z; coordinates of predicted likely future eye position (120).
DNEW: Record of 12 integers; x,y,z, coordinates of the four corners of display field-of-view; the plane of these points reflects the predicted future field-of-view attitude corresponding to PNEW.
PIX: Array [1 to SAMPLE SIZE] of records (same data type as PNEW) of display pixel positions (x,y,z), the horizontal and vertical field-of-view coordinates rotated to the plane of display.
RAY: Record of 3 real numbers x,y,z where SQRT (x2+y2+**2)=1.0; unit vector that points from eye position PNEW to screen position PIX.
VOX-INCEPT: Voxel # of a voxel containing a terrain surface that is intercepted by the sampling ray projected along RAY.
BLOCK-SIZE: Odd integer (1, 3, 5, 9, . . .); dimension, in voxels, of a cube consisting of BLOCK-SIZE ***3 voxels that surrounds voxel identified by VOX-INTERCEPT.

The algorithm associated with box 105 is as follows:

```
BEGIN PROCEDURE LOOKAHEAD (PNEW, DNEW)
Uniformaly sample the display field-of-view,
DNEW, to select SAMPLE-SIZE pixels; stored in PIX;
FOR I:= 1 to SAMPLE-SIZE DO
Determine direction of sampling ray unit
vector, RAY, from eye position PNEW to display
screen position PIX(I);
WHILE voxel transparent DO
Execute a ray trace along RAY in steps of
STEP-SIZE starting at PIX(I); calculate
VOX# from x,y,z;
test VOX-MAP (VOX#) for transparency;
END WHILE
VOX-INCEPT:= VOX#;
RANGE:= STEP-SIZE* number of steps taken along
RAY to VOX-INCEPT;
BLOCK-SIZE:= Direct function (RANGE) (Set number
of voxels paged into memory)
FOR J:= to BLOCK-SIZE**3 DO
Increment or decrement VOX-INCEPT to determine
VOX# of each adjacent voxel comprising a cube
whose dimensions, in voxels, are BLOCK-SIZE
and whose center is voxel# VOX-INCEPT;
Check VOX-MAP to see if VOX# is a surface
voxel;
Check MEMORY-MAP to see if voxel VOX# is
``` stored in main memory as TERRAIN-MAIN (PAGE#);
(MEMORY-MAP is stored in associative memory
and therefore can be addressed by VOX#);
If (VOX# NOT in MEMORY-MAP) AND (VOX# NOT
surface voxel) then accumulate requests in
REQUEST (COLLECT) to retrieve voxel VOX# from
disk; (REQUST (COLLECT) defined under PROCEDURE
RETRIEVE)
END FOR J
END FOR I
END LOOKAHEAD.

The variables and data structure for box 106 are as follows:

REQUEST: Array [1 to 3] are buffer arrays of records in which retrival requests are (1) accumulated, (2) sorted, and (3) activated; VOX#, ACCESS;

COLLECT: Integer 1, 2, or 3 pointing to the segment of REQUEST in which retrival requests from LOOKAHEAD and the main display program are accumulated prior to sorting;

SORT: Pointer to REQUEST segment in which requests are sorted;

ACTIVE: Pointer to REQUEST segment from which previously sorted requests are read, in order, and used to generate seek commands to disk drives;

DISK DIR: Array [0 to number of surface voxels] of records listing physical disk address of all surface voxels; sorted in ascending order of VOX#:
.VO-ADDR: voxel#
.DISK-ADDR: drive#, cylinder#, surface#, sector#;

ACTIVE COMPLETE: Flag that indicates that all request in REQUEST (ACTIVE) have been processed.

The algorithm associated with box 106 operates to accept VOX# retrival requests in REQUEST (COLLECT); requests can come from LOOKADHEAD and from the main display program both of which execute concurrently; for each VOX#, determines the corresponding physical disk address from DISK DIR; prepares seek commands to the disk drives in cylinder# order, alternating between ascending and decending order; this minimizes disk head movement and thus significantly reduces average access time.

The algorithm associated with box 106 is as follows:

```
(During initialization COLLECT:= 1; SORT:= 2; ACTIVE:= 3;)
WHILE REQUESTS (COLLECT) NOT empty DO
For each request in REQUEST (COLLECT) .VOX# DO
Perform augmented binary search on DISK DIR
for VOX#; (Rather than starting the binary
search at the mid-point, i.e., DISK DIR
(START) where START:= size of DISK DIR/2,
start at START:= size of DISK DIR *(VOX#/
Max(VOX#)). Set beginning search step
size to SMALL STEP which is determined
during initialization as the minimum
N**2 that is greater than 0.5 * Max (Abs
( EST VOX# - DISK DIR.VOX ADDR)) where ·
EST VOX*:= I/size of DISK DIR)* Max (VOX#),
for I:= 1 to size of DISK DIR.
This procedure significantly reduces the
number of search steps as compared to a
standard binary search.)
REQUEST (SORT).VOX#:= DISK DIR.VOX ADDR;
REQUEST (SORT).ACCESS:= DISK DIR.DISK ADDR;
(During initialization DISK DIR is sorted
into ascending order of VOX*; since the voxel
data base is read only. DISK DIR is not updated
during processing; unlike the conventional
file management approach, there is no need to
reorder DISK DIR after initialization.
END FOR
Sort REQUEST (SORT) into (ascending/decending) order of
cylinders#;
Toggle (ascending/decending) order indicator;
WHILE ACTIVE COMPLETE NOT set DO
(wait for all requests in REQUEST (ACTIVE) to
be processed)
END WHILE:
Switch buffer areas)
TEMP:= COLLECT;
COLLECT:= ACTIVE;
ACTIVE:= SORT;
SORT:= TEMP;
END WHILE REQUEST;
END RETRIEVE.
PROCEDURE DISK INTERRUPT (ACTIVE COMPLETE);
(Priority interrupt service routine that is activated
when disk drive returns seek complete command in response
to request in REQUEST (ACTIVE); stores retrieved voxel
file in the next available page in main memory, PAGE #;
updates MEMORY MAP)
Read from disk TERRAIN DISK (REQUEST (ACTIVE).ACCESS)
and store in TERRAIN MAIN (PAGE#) in main memory;
(Update MEMORY MAP for voxel just retrieved)
MEMORY MAP (PAGE#):= REQUEST(ACTIVE).VOX#;
(Increment PAGE # so that the next voxel retrieved will
overwrite the least recently retrieved voxel currently
in main memory)
PAGE #:= 1 + PAGE # MOD (MAXPAGE);
If all requests in REQUEST (ACTIVE) complete
THEN Set Active COMPLETE flag
ELSE Send next seek command in REQUEST (ACTIVE)
to disk drive;
RETURN from interrupt;
END DISK INTERRUPT.
```

A new and improved method for use with a vehicle simulator which allows for the rapid update of displayed terrain data including areas of terrain discontinuities has been described. Although the present method was described with reference to an aircraft simulator, other types of vehicle simulators may employ this invention, such as a tank, or helicopter, or the like.

The above-described embodiment is merely illustrative of one of the many particular specific embodiments which represent applications of the principles of the present invention. Clearly, numerous and varied other arrangements may be readily devised bY those skilled in the art without departing from the spirit and scope of the invention.

What is claimed is:

1. A method for use in a system which projects a time varying computer generated image scene representation of terrain as viewed from a moving vehicle which traverses a simulated path, said image scene being derived from a data base stored in secondary storage, said method comprising the steps of:

predicting a set of possible future positions of the vehicle after a predetermined time interval, said predicted positions being calculated based on the motion dynamics of the vehicle;

for a number of possible future positions, sampling the terrain data base with line-of-sight rays projected from the position of the vehicle operator's eye into the data base in cartesian coordinate space;

marking the data at the point of sample ray terrain surface intersection and the data for surfaces adjacent to that point as likely candidates for near-future display update;

accessing the marked data and storing them in high speed main memory; and displaying selected ones of the stored data segments based on the simulated path and position of the vehicle after the predetermined time interval has elapsed;

whereby a rapid update of the displayed terrain in the near future is achieved.

2. A method to generate sampling rays as claim 1 by sampling picture elements (pixels) within the field-of-view in the plane of the display and projecting rays from the eye position through each of the sample pixels.

3. A method to store and retrieve scene data, as claimed in claim 1, that is a collection of elements corresponding to cubic volumes that make up a three dimensional terrain model, only those volume elements (voxels) containing terrain surfaces are stored, said method utilizes a bit map of all voxels in the terrain model, each bit having a memory address that is computable from the x, y, z cartesian coordinate of the voxel, the binary state of each bit so addressed indicating whether the corresponding voxel does or does not contain a terrain surface.

4. A method to mark the data to be accessed as claimed in claim 1 by selecting a set of data base volume elements (voxels) that form a cube whose center is the voxel containing a terrain surface intersected by a projected sampling ray, the dimensions of said cube are calculated as a direct function of the distance from the eye position to the intersected surface voxel.

* * * * *